April 4, 1939.  J. A. HAGEN  2,153,184
MANUFACTURE OF HOLLOW ARTICLES OF RUBBER
Filed April 19, 1938  2 Sheets-Sheet 1
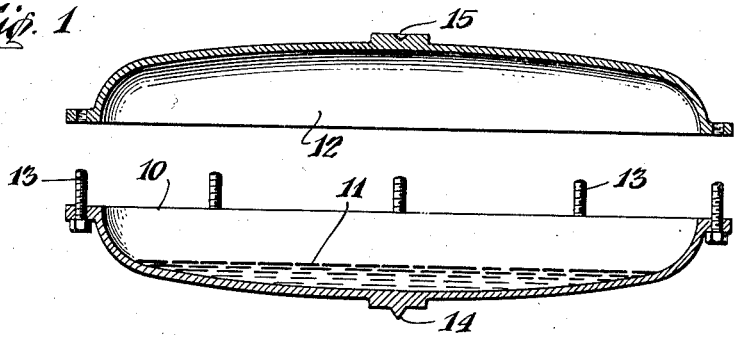
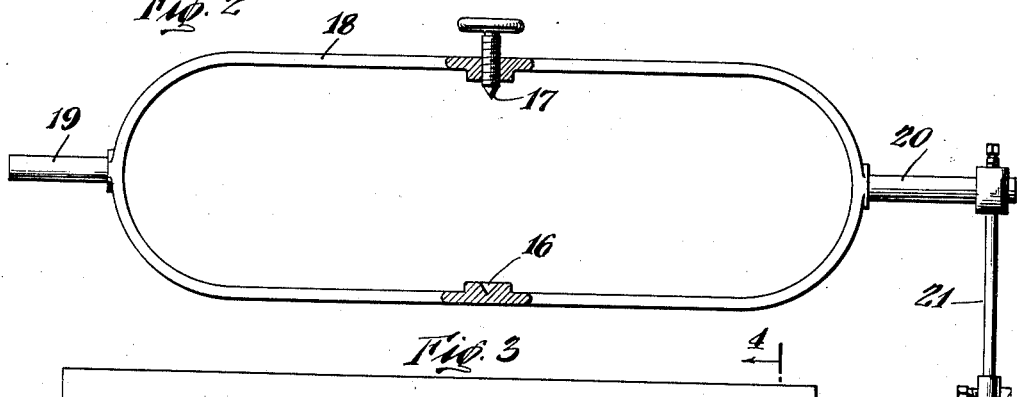
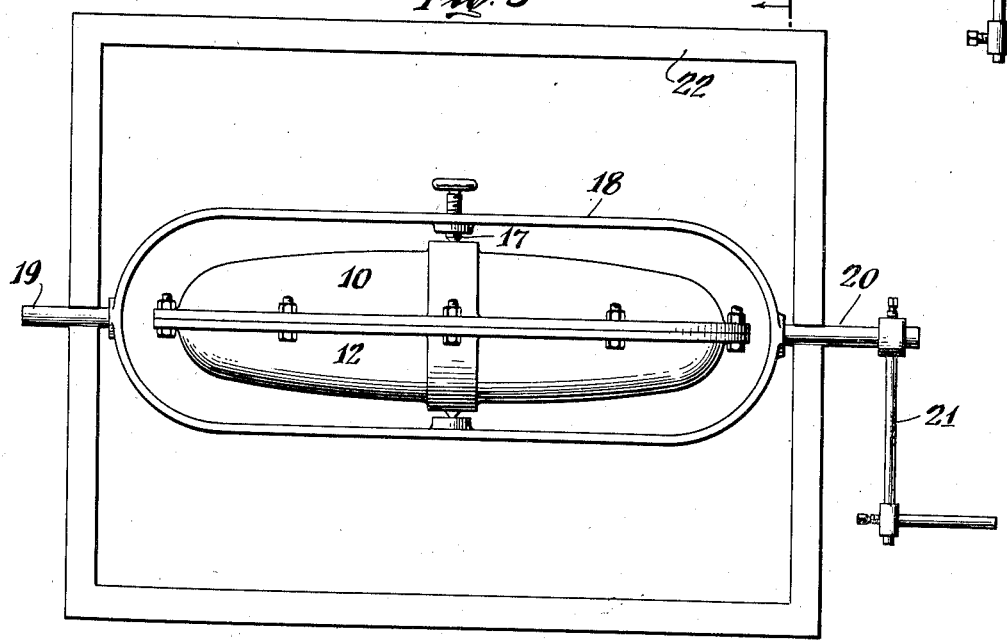
INVENTOR
John A. Hagen
BY
Cooper, Kerr & Dunham
ATTORNEYS

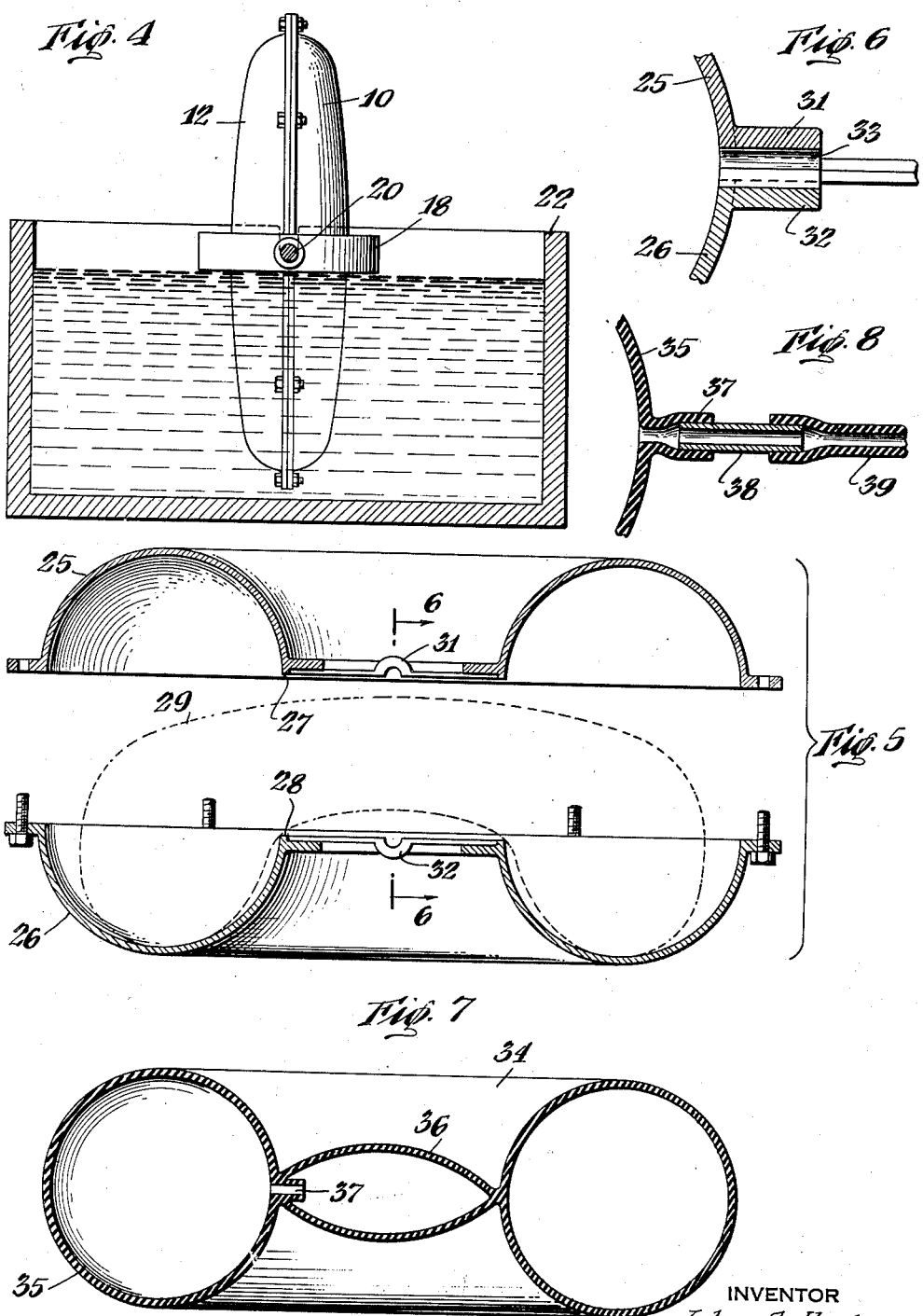

Patented Apr. 4, 1939

2,153,184

UNITED STATES PATENT OFFICE 2,153,184

MANUFACTURE OF HOLLOW ARTICLES OF RUBBER

John A. Hagen, Passaic, N. J., assignor to Kaysam Corporation of America, Dover, Del., a corporation of Delaware Application April 19, 1938, Serial No. 202,833

12 Claims. (Cl. 18—47.5)

This invention relates to methods and apparatus for the manufacture of inflated or inflatable hollow articles of rubber, as for example a mattress-like article or a cushion, having indented parts giving something like a tufted effect similar to the common hair- or cotton-filled mattress. Another example is a vehicle tire or inner tube. By the conventional methods such articles are made of masticated rubber and for that reason often possess certain defects, among which may be mentioned low resistance to oxidation and aging influences, and low tensile strength and resistance to tearing, especially when, as in the case of an inner tube, the article is produced in part least by extrusion. Further, in such methods curing requires relatively high temperatures, since the use of ultra-accelerators causes partial curing of the stock during mixing, with resultant injury to the material and to the finished product. Also, the fabrication of certain articles, notably vehicle tires and inner tubes of large cross-section, say those for use on wheels of small diameter, often requires considerable tailoring, with high labor costs, uneven or non-uniform gage, and other undesirable features. In many cases, too, if not in all cases, the article has parts united by a seam, which, to avoid a line of weakness, is covered by a strip of rubber which thickens the wall of the article, often at points where such thickening is a disadvantage.

I have accordingly been led to devise the present invention, which has for an important object the provision of a process and apparatus by which hollow rubber articles can be produced which are uniform in gage, or thinned or thickened where thinness or thickness is desired. Another object is to provide a process and apparatus by which such articles can be produced having high tensile strength, high elasticity and resistance to tearing, and high resistance to oxidation and aging influences, with resulting long life under severe conditions of use.

According to my improved method the article is made from latex, by which I mean any aqueous dispersion of natural or synthetic rubber or rubber-like material. In practicing the process in the preferred way I first produce an inflated hollow article by gelling a layer of a suitable latex mix on the inner surface of a closed hollow mold containing air or other gaseous medium. This step can be conveniently performed by enclosing the necessary quantity of a heat-sensitive latex mix in a hollow mold containing air, and rotating the mold while it is partly or wholly submerged
in water or other heating medium at a tempera-
ture which will cause the mix to set, thus producing an inflated article of the shape of the mold. The article thus obtained is placed in one part of a two-part mold of the shape or substantially the shape which the finished article is to have. This latter mold is made in two parts, one or both of which are so formed that when the second part is pressed down upon the preliminary inflated article placed in the first part, opposite walls of the article are pressed firmly into cohering contact with each other at one or more points, thus producing an inflated portion or portions surrounding the point or points at which the walls were caused to cohere. The article thus shaped is vulcanized or cured, preferably though not necessarily, in a suitable mold of the desired final shape, while maintaining in the article sufficient inflation to keep it in shape.

Apparatus suitable for practicing the process, in the preferred manner for making inner tubes for pneumatic tires, is illustrated in the accompanying drawings, in which:

Fig. 1 illustrates in diametral cross-section the parts of a two-part mold for making the preliminary article in a form which may be conveniently termed pillow-shaped.

Fig. 2 illustrates in plan a simple apparatus, in the form of an elongated cradle, for rotating the closed mold on the proper axes to spread the liquid latex over the inner surface of the mold.

Fig. 3 is a plan view and Fig. 4 a section on line 4—4 of Fig. 3, showing the cradle, carrying the mold, arranged across a tank of hot water for rotation of the mold in contact with the latter to spread and gel the latex in the form of a layer on the inner surface of the mold.

Fig. 5 illustrates in diametral cross-section a two-part annular mold, with the preliminary pillow-shaped article of gelled latex in the lower part, for converting the preliminary article into an annular shape.

Fig. 6 is a detail section, on a plane indicated by the line 6—6 in Fig. 5, but taken after the mold shown in the latter figure is closed.

Fig. 7 is a diametral cross-section of an annular article (for making an inner tube) produced from the pillow-shaped article by means of the mold shown in Fig. 5.

Fig. 8 is a detail section on the plane of Fig. 7, illustrating a method of inflating the annular article at a later stage of its manufacture.

In using the apparatus for making an inner tube for vehicle tires, the appropriate quantity of heat-sensitive liquid latex is deposited in the mold part 10, as indicated at 11 in Fig. 1. The other part 12 of the mold is then clamped hermetically on the lower part by any suitable means, for example bolts 13, thus producing a closed hollow mold with the latex confined therein. The mold may be figured in intaglio on its inner surface to produce a legend or other marking in relief on the gelled latex article.

The mold 10—12 is equipped on one side with a tapered journal 14 and on the other side with a tapered bearing 15, to cooperate respectively with a tapered bearing 16 and a tapered journal 17 on the sides of an elongated cradle 18 in which the closed mold, containing the liquid latex mix, is placed for rotation in the aforesaid bearings. The cradle itself is provided at its ends with journals 19, 20, one of which has a crank 21 by which the cradle may be manipulated. The cradle carrying the mold is placed across an open tank 22, Fig. 3, containing hot water, with the journals 19, 20 resting in open-topped bearings in the sides of the tank as shown in the figure last mentioned. It will be observed that the mold can be rotated inside of the cradle and that the latter can be rotated in its bearings. The mold can thus be rotated on different axes simultaneously or successively, or at different inclinations to the horizontal, to spread the latex over the inner surface of the mold. If desired a plurality of molds can be operated simultaneously by means of an apparatus such as that disclosed in Kay Patent No. 1,998,897, issued April 23, 1935.

When the latex mix has been distributed as desired over the inner surface of the mold and gelling is complete, the mold is opened and the article removed. The removal is conveniently effected by lowering the bottom half of the mold slowly in a tank of water to float the article out. Washing of the article can then be effected in the same tank if washing is necessary or desirable.

Shaping to an annular form is effected by means of a two-part annular mold 25—26 such as shown in Fig. 5. It will be observed that the mold parts illustrated are formed on their inner edges with narrow ribs 27, 28, by which the opposite walls or sides of the inflated pillow-shaped article (indicated at 29, as distorted by its own weight) are pressed together along a narrow circular line when the upper part of the mold is brought down upon the lower part. The two ribs are interrupted by inwardly extending lugs or extensions 31, 32 which are cooperatively grooved so that when the two mold parts are brought together a tubular neck 33 will be formed as shown in Fig. 6. To minimize the danger of pinching the outer part of the pillow-shaped article between the outer edges of the mold-parts, the latter should be made somewhat larger in diameter than the article itself, as will be readily understood.

The preliminary or intermediate pillow-shaped article having been laid on the open lower part 26 of the annular mold as indicated at 27 in Fig. 5, the upper part of the mold is brought down upon the lower part and held firmly in place for a moment or so. This brings the opposite walls of the article into firm contact between the annular ribs 27, 28, and causes the walls to unite along a narrow circular band, producing thereby an integral union. The neck 33 keeps the annular portion of the article in free communication with the portion enclosed and bounded by the ribs, and the parts of the walls (of the article 27) spanned by the grooves in the mold-extensions 31, 32 are not pressed together. The shaped article 34, Fig. 7, therefore has the form there indicated, consisting of an annular inflated portion 35 and an inflated inner disk-like portion 36 connected to the former portion by a tubular neck 37.

Removing the annular article from the mold, the part 36 is cut out, care being taken to preserve the neck 37. The annular article is thus deflated, but it can be reinflated by means of the neck. For this purpose a rigid tube 38, Fig. 8, may be inserted in the latter and connected by a rubber tube 39 to a source of air under pressure sufficient to inflate the article, preferably to about the size of the shaping mold 25—26, Fig. 5, after which the tube 39 is closed, say by means of a pinch-cock, not shown, and then disconnected from the pressure source.

The annular article can now be dried. In the drying operation the wall shrinks, and it is therefore sometimes desirable to let out a little air from time to time. Otherwise the internal pressure may cause all the shrinkage or too much of it to take place across the thickness of the wall, thus unduly thinning the latter if the article is distended in drying by the full internal pressure. Or the annular article can be placed in a foraminous form of the desired annular shape and dried therein under higher pressure. Such a form can be conveniently made of wire meshed-fabric. This method of drying has the advantage that higher pressure, say high enough to hold the walls of the article in snug contact with the foraminous shaper, aids in squeezing the water out and promotes synaeresis. In either method of drying the shrinkage is effectively controlled to prevent undesired thinning of the wall of the article and to maintain a suitable shape.

When the article is properly dried it is replaced in the shaping mold or in another annular curing mold and subjected to the proper vulcanizing temperature, with sufficient inflation through the opening 37 to insure that the outer surface of the article is in proper contact with the inner surface of the mold. This is especially desirable when the inner surface of the curing mold is figured in intaglio to produce a desired legend or other marking in relief on the outer surface of the article. When the curing has been effected the neck 37 can be cut off and the opening left can be used for affixing the usual tire-valve.

It will be understood that a wide variety of latex mixes can be employed in the process. A mix found particularly suitable for inner tubes is made of a latex having about 60 per cent solids, preferably the widely used stable latex sold under the trade name "Revertex", using 151.5 parts thereof by weight. To this a paste is added, made of zinc oxide 30 parts by dry weight, sulphur 1.5, Age-Rite White (anti-oxidant, di-beta-naphthyl-para-phenylene diamine) 1.0, Zenite A (accelerator, zinc salt of mercapto-benzothiazole 97% and tetramethyl-thiuram-monosulphide 3%) 1.2, red iron oxide 5.0, Darvan (dispersing agent, sodium salt of a polymerized poly-aryl sulphonic acid) 0.25, gum arabic 0.25, and water 20. With addition of water the wet weight of the mixture is brought up to about 250, having a solid content of about 150 parts on the dry basis. As the gelling agent for the above mix ammonium nitrate is preferred, 27.2 parts of 2.14 normal solution being sufficient to cause complete gelling at a temperature of about 80°–82° C. in about 2 to 4 minutes in a mold made of aluminum approximately one-eighth of an inch thick.

It is to be understood that the invention is not limited to the specific apparatus and procedure herein described but can be carried out in other ways without departure from its spirit as defined by the following claims.

I claim:—

1. Process of making hollow articles of rubber, which comprises forming an inflated hollow article by gelling latex in a layer on the inner surface of a closed hollow mold containing a gaseous medium; removing the inflated article from the mold; compressing opposite walls of the article into cohering contact with each other within the periphery of the article; and curing the article while the same is sufficiently inflated to produce a cured article of the desired size and shape.

2. Process of making hollow articles of rubber, which comprises forming an inflated hollow article by gelling latex in a layer on the inner surface of a closed hollow mold containing a gaseous medium; removing the inflated article from the mold; compressing opposite walls of the article into cohering contact within the periphery of the article to form an inflated article having an indented portion; washing and drying the article; and curing the article while the same is sufficiently inflated to produce a cured article of the desired size and shape.

3. Process of making hollow articles of rubber, which comprises compressing into cohering contact opposite walls of a hollow inflated pillow-shaped article of gellied latex, at a point within the periphery of the inflated pillow-shaped article, and producing thereby an inflated annular article; and curing the article in an annular mold while maintaining sufficient inflation thereof to keep the outer surface of the article in contact with the inner surface of the mold.

4. Process of making hollow articles of rubber, which comprises compressing into cohering contact, along an interrupted annular line, opposite walls of a hollow inflated article of gelled latex at a point within the periphery of the inflated article, and producing thereby an inflated annular portion surrounding and integrally connected to an inner portion with a passage extending into the latter for subsequent inflation of the annular portion; removing the inner portion; inflating the annular portion; and curing the annular portion while maintaining sufficient inflation thereof to keep the same in a desired shape.

5. Process of making hollow articles of rubber, which comprises compressing into cohering contact along an annular line opposite walls of a hollow inflated article of gelled latex at a point within the periphery of the inflated article, and producing thereby an inflated outer annular portion surrounding and integrally connected to an inner inflated portion, with a passage connecting the interiors of said portions; removing the inner portion from the annular portion; inflating the annular portion through said passage and placing the annular portion in an annular form for curing; and curing the annular portion while maintaining sufficient inflation thereof to keep the same in the shape defined by the annular form.

6. Process of making hollow articles of rubber, which comprises compressing, into cohering contact along an annular line, opposite walls of a hollow inflated article of gelled latex at a point within the periphery of the inflated article, and producing thereby an inflated annular outer portion surrounding and integrally connected to an inner portion; drying the annular portion while keeping the same sufficiently inflated to maintain a desired shape and size; curing the annular portion with sufficient inflation thereof to produce a cured article of a desired size and shape; and deflating the cured article; the said inner portion being removed from the annular outer portion at an appropriate stage of the process.

7. Process of making hollow articles of rubber, which comprises forming an inflated hollow article by placing in a hollow mold containing a gaseous medium a suitable quantity of heat-sensitive latex containing a vulcanizing agent, closing the mold, and rotating the closed mold while heating it whereby the latex is spread over the inner surface of the mold and gelled thereon; removing the inflated article from the mold, compressing opposite walls of the article into cohering contact within the periphery of the article to form an inflated annular article, washing and drying the annular article, and curing the annular article while the same is sufficiently inflated to produce a cured article of the desired size and shape.

8. Process of making hollow articles of rubber, which comprises placing in a hollow mold containing a gaseous medium a suitable quantity of heat-sensitive latex containing a gelling agent, closing the mold, rotating the mold on a plurality of axes while heating the mold to spread the latex over the inner surface of the mold and gel the spread latex thereon; removing the resulting inflated hollow article from the mold; compressing into cohering contact along an annular line opposite walls of the hollow inflated article within the periphery thereof and producing thereby an inflated annular outer portion surrounding and integrally connected to an inner portion; drying the annular portion while controlling the inflation thereof to maintain a desired shape and size; curing the annular portion with sufficient inflation thereof to produce a cured article of a desired size and shape; and deflating the cured article; the inner portion being removed from the annular outer portion at an appropriate stage of the process.

9. Process of making hollow articles of rubber, which comprises compressing into coherent contact opposite walls of a hollow inflated pillow-shaped article of gelled latex, within the periphery of the inflated pillow-shaped article, and producing an inflated annular article; washing the article; drying the article and controlling the shrinkage thereof during drying to prevent undesired thinning of the walls of the article; and curing the dried article in an annular mold while maintaining sufficient inflation thereof to keep the outer surface of the article in contact with the inner surface of the mold.

10. Process of making hollow articles of rubber, which comprises compressing into cohering contact along an annular line opposite walls of a hollow inflated pillow-shaped article of gelled latex within the periphery of the inflated article and producing thereby an inflated outer annular portion surrounding and integrally connecting to an inner inflated portion, with a passage connecting the interiors of said portions; washing the article; removing the inner portion from the annular portion; inflating the annular portion through said passage and drying the annular portion while controlling shrinkage thereof; placing the annular portion in an annular form for curing; and curing the annular portion while maintaining the same sufficiently inflated to keep it in the shape defined by the annular form.

11. Process of making hollow articles of rubber, which comprises compressing between the halves of a two-part annular mold a pillow-shaped hollow inflated article of gelled latex to press into cohering contact along an annular line opposite walls of the inflated pillow-shaped article with the periphery thereof, and producing thereby an inflated outer annular portion surrounding and integrally connected to an inner portion; removing the inner portion from the annular portion; placing the annular portion in an annular form for curing; and curing the annular portion while maintaining sufficient inflation thereof to keep the same in the shape defined by the annular form.

12. Process of making hollow articles of rubber, which comprises compressing into cohering contact opposite walls of a hollow inflated pillow-shaped article of gelled latex, within the periphery of the inflated pillow-shaped article, and producing an inflated annular article; washing the article; drying the article and controlling the internal pressure thereof during drying to prevent undesired thinning of the walls of the article by shrinkage; and curing the dried article in an annular mold while maintaining sufficient inflation thereof to keep the outer surface of the article in contact with the inner surface of the mold.

JOHN A. HAGEN.

CERTIFICATE OF CORRECTION.

Patent No. 2,153,184.　　　　　　　　　　　　　April 4, 1939.

JOHN A. HAGEN.

It is hereby certified that error appears in the printed specification of the above numbered patent requiring correction as follows: Page 1, first column, line 15, after the word "part" insert at; page 3, first column, line 32, claim 3, for "gellied" read gelled; and second column, line 65, claim 10, for "connecting" read connected; page 4, first column, line 7, claim 11, for "with" read within; and that the said Letters Patent should be read with this correction therein that the same may conform to the record of the case in the Patent Office.

Signed and sealed this 9th day of May, A. D. 1939.

Henry Van Arsdale (Seal)　　　　　　　　　　　　　　　　Acting Commissioner of Patents.